United States Patent
Boldt

(10) Patent No.: US 6,797,235 B2
(45) Date of Patent: Sep. 28, 2004

(54) DEVICE AND METHODS FOR MODIFYING AN ATMOSPHERE

(75) Inventor: Wes Boldt, West Des Moines, IA (US)

(73) Assignee: CO2 Technologies, Inc., West Des Moines, IA (US)

( * ) Notice: Subject to any disclaimer, the term of this patent is extended or adjusted under 35 U.S.C. 154(b) by 56 days.

(21) Appl. No.: 10/235,777

(22) Filed: Sep. 5, 2002

(65) Prior Publication Data

US 2004/0047760 A1 Mar. 11, 2004

(51) Int. Cl.⁷ .............................. B01J 7/00; B01J 19/00
(52) U.S. Cl. ................. 422/40; 422/1; 422/4; 422/120; 422/123; 422/306; 426/418; 426/419; 426/506
(58) Field of Search .............................. 422/40, 4, 120, 422/123, 306; 426/418, 419, 506

(56) References Cited

U.S. PATENT DOCUMENTS

| | | | |
|---|---|---|---|
| 4,036,228 A | | 7/1977 | Theeuwes |
| 4,384,972 A | | 5/1983 | Nakamura et al. |
| 4,664,922 A | | 5/1987 | Leon et al. |
| 4,762,722 A | * | 8/1988 | Izumimoto et al. ......... 426/124 |
| 4,995,556 A | * | 2/1991 | Arnold, III .................. 239/57 |
| 5,489,399 A | | 2/1996 | Koyakumaru et al. |
| 6,083,535 A | | 7/2000 | Chiba et al. |
| 6,106,775 A | * | 8/2000 | Fuller .......................... 422/40 |
| 6,177,183 B1 | | 1/2001 | Hekal |
| 6,316,520 B1 | | 11/2001 | Hekal |
| 6,340,654 B1 | | 1/2002 | Iijima |

* cited by examiner

Primary Examiner—Krisanne Jastrzab

(57) ABSTRACT

The present invention provides a device for modifying an atmosphere in proximity to the device, the device comprising a sachet comprising a semipermeable material, and a composition including a mixture of acetylsalicylic acid and sodium bicarbonate contained within a cavity of the sachet. The invention further provides methods for modifying an atmosphere comprising placing a mixture of a carboxylic acid and a base in the atmosphere, wherein the atmosphere has a sufficient level of water vapor such that, upon contact of the water vapor with the mixture, carbon dioxide is produced.

16 Claims, 2 Drawing Sheets

DEVICE AND METHODS FOR MODIFYING AN ATMOSPHERE

BACKGROUND OF THE INVENTION

1. The Field of the Invention

The present invention relates to a device and methods for modifying an atmosphere. More specifically, the present invention relates to the use of a mixture of acetylsalicylic acid and sodium bicarbonate to modify an atmosphere.

2. The Prior State of the Art

The preservation of fish has been a major concern for fishermen and fish processors for centuries. Originally, man salted and dried fish to preserve it. Since the advent of mechanical refrigeration, fish have been preserved by freezing and refrigeration, thus permitting fishermen to make longer fishing trips, as well as transport the fish long distances over land or water.

The length of time over which fish maintains its freshness is commonly referred to as its shelf life. The shelf life of fish is determined by a number of factors, including the total number of each type of bacteria initially present, the specific types of bacteria present, the temperature of the flesh of the fish and of the surrounding atmosphere, and the pH of the fish. It is known that to extend the shelf life of fish, one may, for example, reduce the number of bacteria present using chemical means, freezing or other methods, create an acidic pH and/or maintain the product below 5° C. in its fresh state. The most common process employed to extend the shelf life of fish is freezing.

An inherent problem with freezing fish is its loss of the "fresh" attributes such as a "pink" or "red" meat color to both the fish flesh and the "blood line" in the fish. The loss of these attributes causes the value of the frozen fish to be much less than the value of fish that has not been previously frozen. This loss of value is an interpretation of the quality of the fish by the consumer. The color of the flesh and blood line of the fish is a major factor in the selling of seafood at the consumer level. Most consumers purchase fish with their eyes rather than with any other factor, such as smell, taste or texture. Therefore, it is desirable to maintain the "fresh" pink/red color of the seafood products as long as possible in order to sell the product at a premium to consumers.

Although many factors may effect changes to the color of fish products, the main reduction of color results from damage to the hemoglobin pigments in the fish. Several of the primary causes for the reduction of hemoglobin pigments, resulting in a corresponding reduction in the "fresh" color of the fish, include oxidation of the "red" hemoglobin pigments in the flesh to a "brown" color; bacterial decomposition of the cells containing the hemoglobin pigments; and destruction and oxidation of the hemoglobin pigment during freezing.

Most unfrozen fish is considered "fresh" for as many as 30 days from catching. However, unfrozen fish this old usually contains high levels of dangerous bacterial decomposition. Bacterial decomposition of fish is the cellular breakdown of the flesh of the fish due to the digestive enzymes of bacteria present on or within the flesh of the fish. Conversely, frozen fish is usually frozen upon catching which reduces the likelihood that the fish will contain significant or harmful levels of bacterial decomposition.

U.S. Pat. No. 6,106,775 discloses a device for modifying an atmosphere in proximity to the device, wherein the device comprises a rigid shell with at least one hole formed therethrough, wherein the shell encases an absorbent material, wherein the absorbant material is adapted to absorb an aqueous composition, and wherein the aqueous composition is formed from combining water, acetylsalicylic acid, and sodium bicarbonate. The atmosphere can be that of a refrigerated space where food (i.e. meat) is stored. In operation, the device is immersed in a volume of water, and placed in a selected atmosphere. Water is evaporated from the absorbant material into the air contained within the shell. Although not explicitly disclosed, carbon dioxide gas is inherently produced by the combination of water, acetylsalicylic acid, and sodium bicarbonate. Thus, in addition to water vapor, carbon dioxide gas is also introduced into the air contained within the shell. The hole or holes in the shell permit the flow of these two gases into the surrounding atmosphere, therey modifying the same. If a food product has been placed in this atmosphere, the now modified atmosphere facilitates a prolonging of the shelf life of the food product. Critical to this invention is the fact that non-vaporous (i.e. liquid) water must be externally applied to the absorbant material, such as by immersing the shell containing the absorbant material in a volume of water, or by pouring water over the shell. Although this device is operable in a variety of environments, the device suffers from the fact that water must be externally and, ultimately, continuously supplied. The device further suffers from the related problem that if the temperature of the atmosphere in which the device is placed is 0° C. or lower, the device is inoperable due to freezing of the water.

Given the current state of the art, it would be desirable to obtain a device for modifying an atmosphere in proximity to the device wherein the device does not require the external and continuous application of liquid water and which is operable at below-freezing temperatures. It would be further desirable to obtain methods for modifying an atmosphere that similarly do not require the external and continuous application of liquid water.

SUMMARY OF THE INVENTION

In one aspect of the invention, there is provided a device for modifying an atmosphere in proximity to the device, the device comprising a sachet comprising a semipermeable material; and a composition including a mixture of acetylsalicylic acid and sodium bicarbonate contained within a cavity of the sachet.

In another aspect of the invention, there is provided a method for modifying an atmosphere comprising placing a mixture of a carboxylic acid and a base in the atmosphere, wherein the atmosphere has a sufficient level of water vapor such that, upon contact of the water vapor with the mixture, carbon dioxide is produced.

In another aspect of the invention, there is provided a method for modifying an atmosphere comprising placing a sachet in the atmosphere, wherein the sachet contains a mixture of a carboyxlic acid and a base, and wherein the atmosphere has a sufficient level of water vapor such that, upon contact of the water vapor with the mixture, carbon dioxide is produced.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
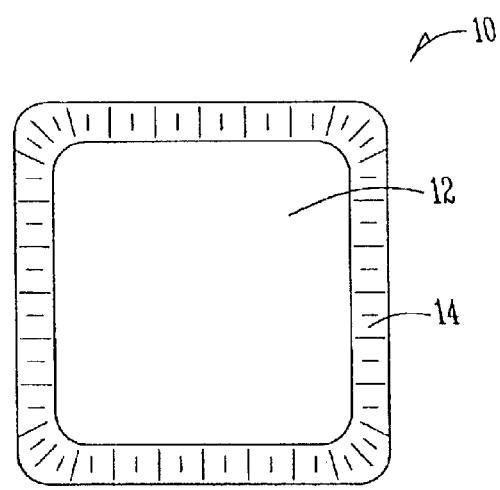
FIG. 1 is a top view illustrating a sachet according to the invention.

As used herein, the term "sachet" is intended to refer to a closed receptacle for a composition. The sachet is "closed" in the sense that the composition is retained within a cavity of the sachet and the sachet volume is sealed around its perimeter, such as by heat sealing. The sachet is comprised of a semi-permeable material As used herein, the term "semi-permeable material" is intended to refer to a material that is gas-permeable, but liquid- and bacteria-impermeable. Gases capable of permeating the semi-permeable material include, for example, water vapor and carbon dioxide. Preferably, the material is a hydrophilic polyolefin co-extruded film. More preferably, the material is a three-layer cast co-extruded film with a A-B-A structure, wherein the A layers each comprise high density polyethylene (HDPE) and the B layer comprises a blend of from about 10% to about 90% low density polyethylene (LDPE) and from about 10% to about 90% linear low density polyethylene (LLDPE). The B layer can additionally comprise from about 10% to about 30% titanium dioxide. Preferably, the HDPE present in the A layers has a density of from about 0.918 grams/cubic centimer to about 0.930 grams/cubic centimeter (ASTM D792-00), and a melt index of from about 0.25 grams in ten minutes to about 15 grams in ten minutes (ASTM D2839-96). Preferably, the LDPE and LLDPE present in the B layer each has a density of from about 0.916 grams/cubic centimeter to about 0.924 grams/cubic centimeter (ASTM D792-00), and a melt index of from about 0.25 grams in 10 minutes to about 15 grams in ten minutes (ASTM D2839-96). Exemplary "semipermeable material" suitable for use in the invention can be obtained from Ampac Packaging, LLC, Cinncinati, Ohio (Product Film Spec. 164W).

As used herein, the term "container" is intended to refer to a container that is capable of holding a sachet of the invention. The sachet is inserted into an opening of the container, and the container preferably includes one or more apertures that permit the sachet to be exposed to the surrounding atmosphere.

The composition contained within the sachet comprises a mixture of a carboxylic acid and a base. The carboxylic acid can be any acid that, when reacted with with a base, results in the production of carbon dioxide. The carboxylic acid can be aliphatic or aromatic.

Aliphatic acids include, but are not limited to, Formic acid, Acetic acid, Propionic acid, Butyric acid, Valeric acid, Caproic acid, Enanthic acid, Caprylic acid, Pelargonic acid, Capric acid, Propiolic acid, Vinylformic acid, Glyoxylic acid, Glycollic acid, 3-Butynoic acid, Crotonic acid, Vinylacetic acid, Pyruvic acid, Isobutyric acid, Oxalic acid, Lactic acid, trans-2-Penten-4-ynoic acid, Propargylacetic acid, Pent-2-enoic acid, Allylacetic acid, Isovaleric acid, Valeric acid, Malonic acid, alpha-Hydroxybutyric acid, 2-Methyllactic acid, 2-Furoic acid, Sorbic acid, trans,cis-2, 4-Hexadienoic Acid, D,L-Propargylglycine, Acetylenedicarboxylic acid, Hydrosorbic acid, beta-Propylacrylic acid, Strawberiff (IFF), Maleic acid, Fumaric acid, Levulinic acid, Caproic acid, 3-Methyl valeric acid, Succinic acid, 2-Heptenoic acid, cis-Hept-3-enoic acid, Methylenesuccinic acid, Oenanthic acid, Oxalacetic acid, Glutaric acid, Peroxyhexanoic acid, Malic acid, alpha-Toluic acid, Furylacrylic acid, trans,trans-Muconic acid, trans-Oct-2-enoic acid, cis-Oct-3-enoic acid, 4-Ethyl-hex-2-enoic acid, trans-3-Hexenedioic acid, Caprylic acid, 2-Ethylcaproic acid, alpha-Ketoglutaric acid, Phenylpropiolic acid, Adipic acid, D-Tartaric acid, Hydrocinnamic acid, p-Hydroxyphenylacetic acid, o-Hydroxyphenylacetic acid, (S)-Mandelic acid, (R)-Mandelic acid, cis-Non-3-enoic acid, alpha-Nonenoic acid, Pelargonic acid, Pimelic acid, 4-Phenyl-but-3-ynoic acid, Peroxyoctanoic acid, 4,6-Decadiynoic acid, p-Hydroxybenzoylformic acid, 4,6-Decadiyne-1,10-dioic acid, (R)-p-Hydroxymandelic acid, p-Hydroxymandelic acid, racemate, (S)-p-Hydroxymandelic acid, 4-Decynoic acid, 4-Ethyl-2-octenoic acid, Dec-3-enoic acid, 6-Acetoxy-5-hexenoic acid, 6-Acetoxy-4-hexenoic acid, 4-Ethylcaprylic acid, Capric acid, Aconitic acid, Suberic acid, 5-Phenyl-pent-4-ynoic acid, Vitamin C, alpha-Mercapto-caprylate, Diperoxyadipic acid, 4-Oxo-4-phenyl-butyric acid, 5-Phenyl valeric acid, Hendecynoic acid, 5-Cyclohexyl-2-pentenoic acid, Cyclohexyl n-valerate, Undecylenic acid, 2-Hendenoic acid, 1-Naphthylacetic acid, trans-10-Hydroxy-dec-8-enoic Acid, Undecanoic acid, Azelaic acid, Peroxydecanoic acid, Benzo[1,3]dioxol-5-yl-propynoic Acid, Hexanoic acid, carboxy-hydroxy-methyl ester, Citric acid, Quinic acid, D-Gluconic acid, 10-Dodecynoic Acid, 9-Dodecynoic acid, 3-Dodecynoic Acid, 7-Dodecynoic acid, 8-Dodecynoic acid, 9-Dodecenoic acid, Dodec-2-enoic acid, 6-Dodecenoic acid, 7-Dodecenoic acid, 3-Methyl-undec-5-enoic acid, cis-5-Dodecenoic acid, 10-Dodecenoic Acid, 8-Dodecenoic acid, 3,8-Dimethyl-dec-5-enoic acid, Dodec-1i-enoic acid, AI3-05999, 9-Methyl-undecanoic acid, Lauric acid, 3 Methyl-undecanoic acid 4-Oxo-6-phenyl-hex-5-ynoic acid, beta-Naphthoxyacetic acid, Sebacic acid, alpha-Mercapto-caprate, 4-Oxo-6-phenyl-hexanoic acid, Galactaric acid, trans,trans-2,12-Tridecadienoic acid, 3,5-Dimethyl-undec-5-enoic acid, 12-Tridecenoic acid, trans-Tridec-2-enoic acid, 11-Methyl-dodecanoic acid, 10-Methyldodecanoic acid, Tridecylic acid, 12-Amino-dodecanoic acid, 2-(3-phenyl-prop-2-ynylidene)-malonic acid, Tetradeca-7,11-diene-5,9-diynoic Acid, alpha-Hydroxy-laurate, 8-Cyclohexyl-octanoic acid, 3-Ethyl-dodec-5-enoic acid, Tetradec-2-enoic acid, Myristoleic acid, cis,cis-5,8-Dihydroxy-2,6-dodecadienoic acid, 11-Methyl-tridecanoic acid, Myristic acid, Aseanostatin P1, Decamethylenedicarboxylic acid, alpha-Mercapto-laurate, Diperoxysebacic acid, cis-10-Pentadecenoic acid, 2-(2-Cyclopentyl-ethyl)-octanoic acid, 13-Methylmyristate, Sarcinic acid, Pentadecyclic acid, 1,13-Tridecanedioic acid, alpha-Hydroxymyristic acid, Decanoic acid, carboxy-hydroxy-methyl ester, 2-(3-Cyclopentenyl)-undecanoic acid, cis,cis-14-Methyl-5,9-pentadecadienoic acid, Palmitelaidic acid, 2-(2-Propenyl)-tridecanoic acid, 2-(2-Cyclopentyl-ethyl)-nonanoic acid, Palmitoleic acid, 2-(4-Cyclohexyl-butyl)-hexanoicacid, 2-(2-Cyclohexyl-ethyl)-octanoic acid, 2-Cyclopropylmethyl-dodecanoic acid, 2-Cyclohexylmethyl-nonanoic acid, trans-2-hexadecenoic acid, 2-Heptyl-2-nonenoic acid, 2-Butyl-dodecanoic acid, Palmitic acid, 14-Methylpentadecanoic acid, Anteisopalmitic acid, 2-Heptyl-nonanoic acid, 2-Hexyldecanoic acid 1,12-Dodecanedicarboxylic acid, alpha-Mercaptomyristate, 2-(3-Cyclopentenyl)-dodecanoic acid, 2-(2-Propenyl)-tetradecanoic acid, 2-(4-Cyclohexyl-butyl)-heptanoic acid, 2-Cyclobutylmethyl-dodecanoic acid, 2-(2-Cyclopentyl-ethyl)-decanoic acid, 2-(3-Cyclohexyl-propyl)-octanoic acid, 2-(2-Cyclohexyl-ethyl)-nonanoic acid, cis-10-Heptadecenoic acid, 2-(Methylcyclohexyl)-decanoic acid, 2-Butyl-12-tridecenoic acid, 2-(Methylcyclopropyl)-tridecanoic acid, 2-Cyclohexyl-undecanoic acid, cis,cis-8-Acetoxy-5-hydroxy-2,6-dodecadienoic acid, 15-Methylhexadecanoic acid, 2-Heptyl-decanoic acid, 14-Methylpalmitic acid, Margaric acid, 2-Hydroxypalmitic acid, gamma-Linolenic acid, Linolenic acid, alpha-Elaeostearic acid, beta-Elaeostearic acid, cis,cis-6,12-Octadecadienoic acid, 8-Octadecynoic acid, Isolinoleic acid, 10-Octadecynoic acid, 12-Octadecynoic acid, 14-Octadecynoic acid, 6-Octadecynoic acid, 4-Octadecynoic acid, cis,cis-7,12-Octadecadienoic acid, 2-Octadecynoic acid, 7-Octadecynoic acid, cis,cis-5,12-Octadecadienoic acid, cis,cis-8,12-Octadecadienoic acid, 5-Octadecynoic acid, 17-Octadecynoic acid, Chaulmoogric acid, 13-Octadecynoic Acid, 15-Octadecynoic acid, 11-Octadecynoic acid, Linolelaidic acid, Linoleic acid, trans,trans-10,12-Octadecdienoic acid, Cilienic acid, cis,cis-6,10-Octadecadienoic acid, 9-Stearolic acid, 2-(2-Cyclohexyl-ethyl)-4-cyclohexyl-butanoic acid, Oleic acid, trans-10-Octadecenoic Acid, Dihydrochaulmoogric acid, 14-Octadecenoic acid, 15-Octadecenoic acid, 17-Octadecenoic acid, 2-(2-Cyclohexyl-ethyl)-decanoic acid, cis-5-Octadecenoic acid, 2-(4-Cyclohexyl-butyl)-octanoic acid, 2-Octyl-2-decenoic acid, 2-Cyclohexyl-dodecanoic acid, 2-(2-Propenyl)-pentadecanoic acid, cis-12-Octadecenoic acid, cis-Vaccenic acid, Octadec-2-enoic acid, trans-Vaccenic acid, Petroselinic acid, 4-Octadecenoic acid, Petroseladic acid, trans-12-Octadecenoic acid, Isooleic acid, 2-(3-Cyclohexyl-propyl)-nonanoic acid, cis-7-Octadecenoic acid, cis-8-Octadecenoic acid, 2-Cyclopentyl-tridecanoic acid, cis-13-Octadecenoic acid, Elaidic acid, cis-2-Methoxy-5-hexadecenoic acid, 11-Cyclohexyl-9-hydroxy-undecanoic acid, cis-2-Methoxy-6-hexadecenoic acid, 2-Ethylhexadecanoic acid, Stearic acid, Isostearic acid, 15-Methyl-heptadecanoic acid, Tridecanoic acid, carboxy-hydroxy-methyl ester, alpha-Mercapto-palmitate, 9,10-Epoxylinolenic acid, 9-Hydroxylinolenic acid, 13-Hydroxylinolenic acid, 16-Hydroxylinolenic acid, 270. 15-Epoxylinolenic acid, 2-(2-Cyclopent-2-enyl-ethyl)-dodecanoic acid, 5-Cyclohexyl-2-(2-cyclohexyl-ethyl)-pentanoic acid, Ricinstearolic acid, 12-Epoxylinoleic acid, 13-Hydroxylinoleic acid, Lactisaric acid, 9-Hydroxylinoleic acid, 9-Epoxylinoleic acid, cis-7-Nonadecenoic acid, trans-7-Nonadecenoic Acid, 2-Cyclohexyl-tridecanoic acid, Ricinoleic acid, Ricinelaidic acid, Oxidooleic acid, trans-8-(3-Octyl-oxiranyl)-octanoic Acid, Nonadecylic acid, 17-Methyloctadecanoic acid, 16-Methyl-octadecanoic acid, 12-Hydroxy-stearic acid, alpha-Hydroxystearic acid, Arachidonic acid, Pulvic acid, Arachidic acid, 3RS,7R,11R-Phytanic acid, 18-Methyl-nonadecanoic acid, 9,10-Dihydroxy-stearic acid, alpha-Mercapto-stearate, 9-Oxo-13-prostenoic acid, Cibaric acid, Protolichesterinic acid, 9-Oxoprostanoic acid, Cervonic acid, Hexadecanoic acid, carboxy-hydroxy-methyl ester, trans-9,12,13-Trihydroxy-10-octadecenoic Acid, Clupanodonic acid, 9,10,12-Trihydroxy-stearic acid, Erucic acid, Brassidic acid, Acetyl aleuritolic acid, Sativic acid, alpha-Disulfodicaprylate, Nervonic acid, Rangiformic acid, cis-6,7,8-Triacetoxy-5-hydroxy-2-decenoic acid, alpha-Disulfodicaprate, Laricic acid, alpha-Disulfodilaurate, 2-Amino-succinic acid, 1-(4-octadecanoyloxy-butyl)ester, alpha-Disulfodimyristate, alpha-Disulfodipalmitate, and alpha-Disulfodistearate.

Aromatic acids include, but are not limited to, Benzoic acid, Anthranilic acid, m-Salicylic acid, Salicylic acid, p-Salicylic acid, Anisic acid, m-Anisic acid, 6-Methylsalicylic acid, o-Anisic acid, 4-Amino-salicylic acid, Protocatechuic acid, gamma-Resorcylic acid, alpha-Resorcylic acid, beta-Resorcylic acid, o-Pyrocatechuic acid, Gentisic acid, Piperonylic acid, Terephthalic acid, Phthalic acid, 3-Formyl-4-hydroxy-benzoic acid, 3-Ethyl-2-hydroxy-benzoic acid, Isovanillic acid, o-Vanillic acid, p-Osellinic acid, 4-Methoxy-salicylic acid, Orsellic acid, Vanillic acid, 5-Methoxy-salicylic acid, Pyrogallolcarboxylic acid, Phloroglucinic acid, Gallic acid, Acetylsalicylic acid, 6-Hydroxy-benzo[1,3]dioxole-5-carboxylic acid, Monoperphthalic acid, 3,5-Dimethoxy-benzoic acid, 2,5-Dimethoxybenzoic acid, Veratric acid, 2,6-Dimethoxybenzoic acid, beta-Orcincarboxylic acid, o-Veratric acid, 3,5-Dihydroxy-p-anisic acid, alpha-Hydroxynaphthalic acid, beta-Hydroxynaphthalic acid, Divaric acid, Syringic acid, 3,4-Dimethoxy-5-hydroxybenzoic acid, 4,6-Dimethoxysalicylic acid, Oxy-beta-Ocrincarboxylic acid, 4-(5-Hydroxy-pentyl)-benzoic acid, 6-Pentyl-salicylic acid, 2-Acetylaminogentisic acid, 2,4,5-Trimethoxybenzoic acid, Eudesmic acid, 2,4,6-Trimethoxybenzoic acid, o-Phenoxy-benzoic acid, m-Phenoxybenzoic acid, Taboganic acid, Olivetolic acid, 4-(5-Hydroxy-pentyloxy)-benzoic acid, 3-Hydroxy-5-phenoxy-benzoic acid, 2-(2-Hydroxy-phenoxy)-benzoic acid, 3-(3-Hydroxy-phenoxy)-benzoic acid, 4'-Hydroxy-3-phenoxybenzoic acid, 5-Hexyl-2,4-dihydroxy-benzoic acid, p,p'-Diphenic acid, 3-(4-Methoxy-phenoxy)-benzoic acid, 2-(3-Phenyl-propynoyl)-benzoic acid, 6-Octyl-salicylic acid, 2-(4-Carboxy-phenoxy)-benzoicacid, Olivetonic acid, 4-(5-Carboxy-3-hydroxy-phenoxy)-benzoic Acid, 6-Decyl-salicylic acid, 3,7-Dihydroxy-dibenzofuran-1,9-dicarboxylic acid, 6-Dodecyl-salicylic acid, Lecanoric acid, Anacardic acid, 6-[8(Z),11(Z)-Pentadecadienyl]salicylic acid, 6-[8(Z)-Pentadecenyl]salicylic acid, 6-Pentadecyl-salicylic acid, Parellic acid, 2,4-Dihydroxy-6-pentadec-8-enyl-benzoic acid, cis,cis,cis-2-Heptadeca-3,6,9-trienyl-6-hydroxy-benzoic acid, cis,cis-2-Heptadeca-6,9-dienyl-6-hydroxy-benzoic acid, Protocetraric acid, cis-2-Heptadec-10-enyl-6-hydroxy-benzoic acid, Divaricatic acid, cis-2-Hydroxy-6 nonadec-12-enyl-benzoic acid, Sphaerophorin, 6-Eicosyl-salicylic acid, 2-(10-Acetoxy-pentadec-8-enyl)-4,6-dihydroxy-benzoic acid, Anziaic acid, cis-2-Heneicos-15-enyl-6-hydroxy-benzoic acid, alpha-Collatolic acid, and Microphyllic acid In a preferred embodiment, the carboyxlic acid is acetylsalicylic acid.

The base can be any base that, when reacted with a carboxylic acid, reuslts in the production of carbon dioxide. Preferably, the base is a carbonate, bicarbonate, tricarbonate, etc. More preferably, the base is a metal carbonate, metal bicarbonate, metal tricarbonate, etc. Examples of such carbonates, bicarbonates, and tricarbonates, etc. include, but are not limited to, calcium carbonate, sodium carbonate, lithium carbonate, potassium carbonate, calcium bicarbonate, sodium bicarbonate, lithium bicarbonate, potassium bicarbonate, etc.

In a most preferred embodiment, the base is sodium bicarbonate.

The total amount of the mixture is not critical to the operability of the invention and will depend on the size of the sachet, although the inventor has discovered that, when the mixture comprises acetylsalicylic acid and sodium bicarbonate, an ideal amount to be placed in a 3"×3" sachet is 1.5 grams. The carboxylic acid:base weight ratio can be from about 1:1 to about 1:100. When acetylsalicylic acid and sodium bicarbonate are used, the acetylsalicylic acid:sodium bicarbonate weight ratio can be from about 1:20 to about 1:1 and, preferably, 1:15.66.

As used herein, the term "atmosphere" is intended to refer to any enclosed space. Examples of such spaces include, but are not limited to, refrigerated spaces where perishable food and non-food products are stored. Examples of perishable food products include fish, meat, poultry, produce, and dairy products (i.e. cheese). Examples of perishable non-food products include plants, such as flowers.

FIG. 1 illustrates a top view of a sachet 10 of the device of the invention. The cavity 12 of the sachet 10 is shown, as are the heat sealed sides 14. The cavity 12 contains a preselected amount of a composition comprising a mixture of a carboxylic acid and a base.

Figure 2A:
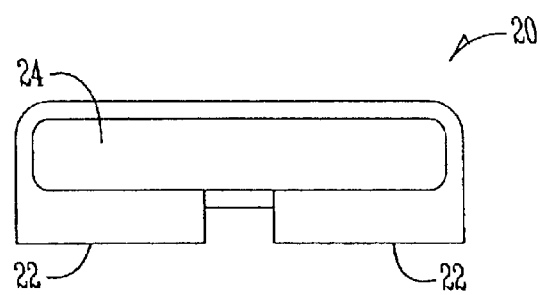
FIG. 2A is a top view illustrating a container adapted to hold in place a sachet according to the invention.
Figures 2B, 2C:
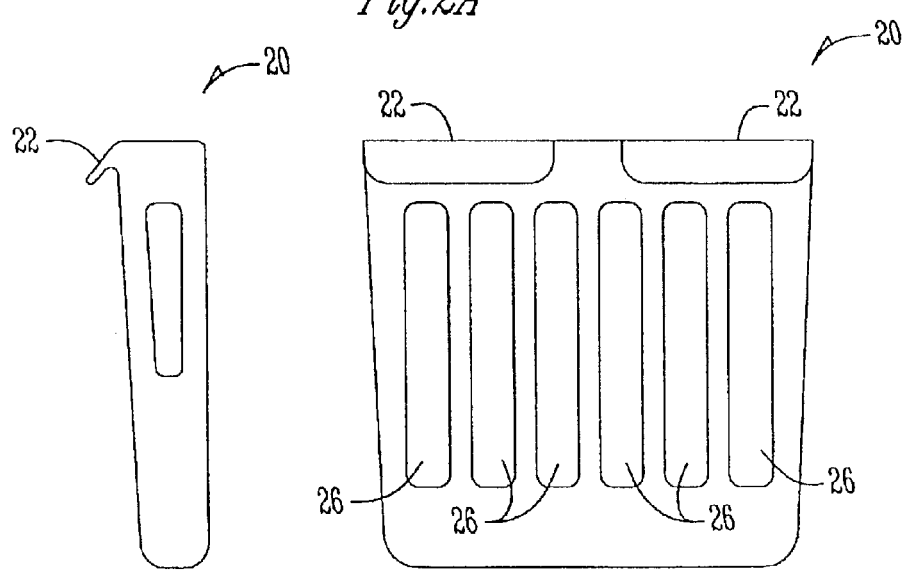
FIG. 2B is a side view illustrating a container adapted to hold in place a sachet according to the invention.
FIG. 2C is a front view illustrating a container adapted to hold in place a sachet according to the invention.

FIGS. 2A, 2B, and 2C illustrate, respectively, top, side, and front views of an exemplary container 20 for holding a sachet 10 of the device of the invention. The container 20 includes one or more flanges 22 that are particularly adapted for hanging the container 20 in a specific environment. The container 20 includes an opening 24 in which a sachet 10 can be inserted. The container 20 further includes a plurality of apertures 26 that allows the sachet 10 to be exposed to the external environment.

Figure 3:
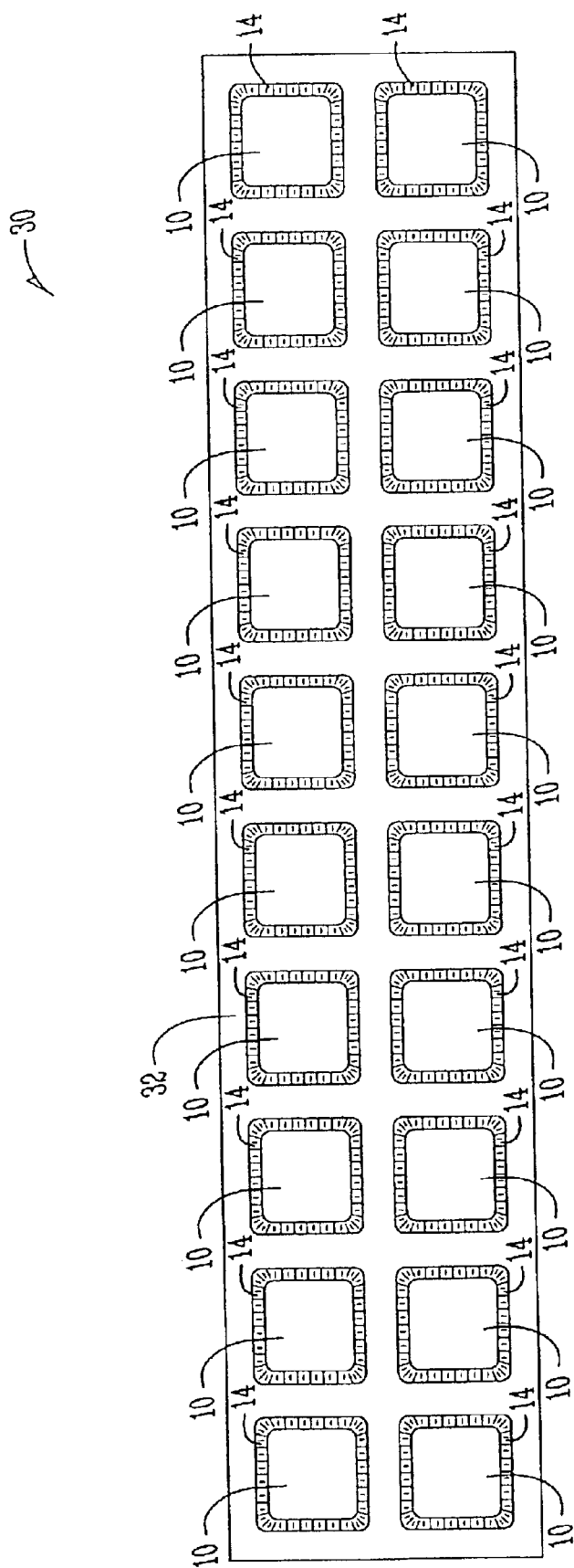
FIG. 3 is a top view of a banner of individual sachets according to the invention.

FIG. 3 illustrates a top view of a banner 30 of individual sachets 10. The banner 30 includes a base 32 for mounting the sachets 10.

EXAMPLE 1
Fish

A plurality of sachets 10, each containing a dry mixture of acetylsalicylic acid and sodium bicarbonate in a weight ratio of 1:15.66 (acetylsalicylic acid:sodium bicarbonate), was inserted into a container 20 and the container 20 transferred to a standard refrigerated container for shipping fresh fish. After seven days, a point at which fresh fish in a standard refrigerated container not containing the sachet 10 would begin to lose their fresh red/pink appearance, the fish retained this distinctive appearance. These fish were indistinguishable from one day old fresh fish that had been placed inside an identical refrigerated container, but without the sachets 10.

Bacterial and fungal counts were also conducted on test (with sachets) and control (no sachets) fish at 11 days post-transfer, with the following results, given as the percentage of organisms present from test fish relative to control:

| | |
|---|---|
| Aerobic Bacteria | 0.02 |
| Coliform Bacteria | 0.12 |
| Yeast/Mold | 100 |
| Lactobacillus | 0.04 |

The sensory and bacteriostatic effects are believed by the inventor to be due to the production, and release from the cavity of the sachets, of carbon dioxide gas from the reaction of acetylsalicylic acid and sodium bicarbonate in the presence of water vapor, and the ultimate production of carbonic acid. The water vapor is provided by the atmosphere at a level sufficient to penetrate the sachets 10 and activate the reaction.

EXAMPLE 2
Floral Holding Coolers

A banner 30 of ten 3"×3" sachets 10, each containing 1.5 g of a dry mixture of acetylsalicylic acid and sodium bicarbonate in a weight ratio of 1:15.66 (acetylsalicylic acid:sodium bicarbonate), was inserted into a two inch-diameter plastic tube with a 35% opening ratio and transferred to a standard, 9600 ft$^3$ (8×12×16) floral holding cooler. Another such banner 30 was simply hung in the cooler (no tube). The cooler had an initial relative humidity level of 55%, and an initial temperature of 3° C. Ambient temperature was at all times greater than or equal to 3° C. Following the transfer of sachets 10 to the cooler, the temperature of the cooler dropped to 1° C., and the relative humidity level increased to 78%.

The temperature decrease and relative humidity increase inside the cooler is believed by the inventor to be due to the production, and release from the cavity of the sachets, of carbon dioxide gas from the reaction of acetylsalicylic acid and sodium bicarbonate in the presence of water vapor. The water vapor is present in the atmosphere at a level sufficient to penetrate the sachet 10 and activate the reaction.

EXAMPLE 3
Strawberries

The industry standard for shipment of strawberries is the Tectrol® atmospheric pallet system. Briefly, this system involves placing a bag over the strawberries, sealing the bottom of the bag, drawing a vacuum in the bag, and flushing the bag with carbon dioxide gas. Because this process is cumbersome, and because it frequently results in about 3 to 5% of the strawberries having to be discarded due to deterioration, the inventor sought to utilize the device of the invention to treat strawberries prior to a standard shipment. Accordingly, a banner 30 of a plurality of sachets 10, each containing 1.5 g of a dry mixture of acetylsalicylic acid and sodium bicarbonate, was placed on the top of a pallet of strawberries, and a plastic bag was placed over the pallet without sealing. The pallet was then shipped under typical conditions. The strawberries in a typical pallet normally generate sufficient moisture to create a relative humidity level of 70–80% inside the bag. The inventor discovered that, following shipment, all of the strawberries retained their fresh appearance and showed no signs of deterioration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for modifying refrigerated space where perishable food and non-food products are stored comprising:

placing a mixture of a carboxylic acid and a base in the refrigerated space, wherein the refrigerated space has a sufficient level of water vapor such that, upon contact with the mixture, carbon dioxide and water are produced to facilitate storage of the perishable food and non-food products.

2. The method of claim 1, wherein the food comprises fish.

3. The method of claim 1, wherein the food comprises meat.

4. The method of claim 1, wherein the food comprises poultry.

5. The method of claim 1, wherein the food comprises produce.

6. The method of claim 1, wherein the food comprises a dairy product.

7. The method of claim 1, wherein the non-food product is non-edible plants.

8. A method for modifying a refrigerated space where perishable food and non-food products are stored, comprising:

placing a sachet made of semipermeable material in the refrigerated space, wherein the sachet contains a mixture of a carboxylic acid and a base, and wherein the refrigerated space has a sufficient level of water vapor such that, upon contact with the mixture, carbon dioxide and water are produced to facilitate storage of the perishable food and non-food products.

9. The method of claim 8 wherein the food comprises fish.

10. The method of claim 8 wherein the food comprises meat.

11. The method of claim 8 wherein the food comprises poultry.

12. The method of claim 8 wherein the food comprises produce.

13. The method of claim 8 wherein the food comprises a dairy product.

14. The method of claim 8 wherein the non-food product is non-edible plants.

15. The method of claim 1, wherein the carboxylic acid is acetylsalicylic acid, and wherein the base is sodium bicarbonate.

16. The method of claim 8, wherein the carboxylic acid is acetylsalicylic acid, and wherein the base is sodium bicarbonate.

\* \* \* \* \*